United States Patent
Su

(10) Patent No.: US 10,127,032 B2
(45) Date of Patent: Nov. 13, 2018

(54) SYSTEM AND METHOD FOR UNIFIED FIRMWARE MANAGEMENT

(71) Applicant: Quanta Computer Inc., Taoyuan (TW)

(72) Inventor: Mei-Lin Su, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 82 days.

(21) Appl. No.: 14/933,514

(22) Filed: Nov. 5, 2015

(65) Prior Publication Data

US 2017/0131991 A1     May 11, 2017

(51) Int. Cl.
*G06F 8/65*      (2018.01)
*G06F 9/4401*   (2018.01)
*G06F 9/445*    (2018.01)

(52) U.S. Cl.
CPC ............ *G06F 8/65* (2013.01); *G06F 8/665* (2013.01); *G06F 9/4401* (2013.01)

(58) Field of Classification Search
CPC .................................. G06F 8/65; G06F 9/4401
USPC ....................................... 717/168–173; 713/2
See application file for complete search history.

(56) References Cited

U.S. PATENT DOCUMENTS

| | | | | |
|---|---|---|---|---|
| 2003/0236970 A1* | 12/2003 | Palmer | ............. | G06F 8/65 713/1 |
| 2004/0030877 A1 | 2/2004 | Frid | | |
| 2004/0215949 A1* | 10/2004 | Dennis | ............. | G06F 9/4408 713/1 |
| 2008/0209193 A1* | 8/2008 | Zhang | ............. | G06F 8/60 713/1 |
| 2009/0064124 A1* | 3/2009 | Chung | ............. | G06F 8/65 717/168 |
| 2009/0161143 A1* | 6/2009 | Nakamoto | .......... | G06F 11/1433 358/1.14 |
| 2012/0110562 A1* | 5/2012 | Heinrich | ............. | G06F 8/65 717/169 |
| 2013/0332914 A1* | 12/2013 | Goda | ............. | G06F 8/65 717/168 |
| 2014/0007067 A1* | 1/2014 | Nelson | ............. | G06F 8/665 717/168 |
| 2014/0047428 A1* | 2/2014 | Prakash | ............. | G06F 21/572 717/168 |
| 2014/0223159 A1* | 8/2014 | Lin | ............. | G06F 9/4401 713/2 |

FOREIGN PATENT DOCUMENTS

TW      314703 I      9/2009

OTHER PUBLICATIONS

Pelner et al., "Minimal Intel Architecture Boot Loader," Jan. 2010, Intel Corp., p. 1-26.*

(Continued)

*Primary Examiner* — Qing Chen
(74) *Attorney, Agent, or Firm* — Nixon Peabody LLP; Eduardo J. Quiñones

(57) ABSTRACT

Embodiments generally relate to firmware management in a computing system. Disclosed are techniques that enable a unified firmware management for multiple embedded devices in a basic input/output system (BIOS) setup menu. By enabling a unified and comprehensive firmware update interface for multiple onboard embedded devices, the present technology can achieve an efficient firmware management mechanism.

18 Claims, 4 Drawing Sheets

(56) References Cited

OTHER PUBLICATIONS

Martinez, Rick, "Dell Client BIOS: Signed Firmware Update," Jan. 2013, Dell Inc., p. 1-22.*
Taiwanese Office Action 105113810 for Application No. 10521504180 dated Dec. 7, 2016 w/ English First Office Action Summary.

* cited by examiner

SYSTEM AND METHOD FOR UNIFIED FIRMWARE MANAGEMENT

FIELD OF THE INVENTION

The disclosure relates generally to firmware management in a computing system.

BACKGROUND

Embedded devices play vital roles in modern servers for providing various functions such as networking, system monitoring and storage control. Embedded firmware is the software that specializes in controlling a specific embedded device. Typically, embedded firmware is stored in the flash memory chip of an embedded device to control its functions.

The embedded firmware of an embedded device sometimes needs to be updated to ensure the device's proper functions. For example, the firmware needs to be updated to coordinate with a newly added component, or the firmware needs to be updated when there is a bug detected in the existing firmware.

However, updating the firmware of an embedded device is a manually intensive procedure, which often demands a sophisticated knowledge of the system from the administrator.

SUMMARY

Aspects of the present technology relate to techniques that enable a unified firmware management for embedded devices in a basic input/output system (BIOS) setup menu. By enabling a unified and comprehensive firmware update interface for multiple onboard embedded devices, the present technology can achieve firmware management with improved efficiency.

In accordance with one aspect of the present disclosure, a computer-implemented method is provided. The method includes booting up a computing device. During the booting, the method includes determining, via a basic input/output system, that the computing device enters a firmware update mode configured to update a firmware associated with an embedded device of the computing device. The method further includes retrieving one or more firmware update images from a storage device associated with the computing device, and updating the firmware associated with the embedded device of the computing device with a respective firmware update image of the one or more firmware update images.

In accordance with another aspect of the present disclosure, a non-transitory computer-readable storage medium storing instructions is provided, the instructions which, when executed by a service controller, cause the service controller to perform operations including: booting up the system, and, during the boot, determining, based on a basic input/output system, that the computing device enters a firmware update mode configured to update a firmware associated with an embedded device of the computing device, displaying a unified setup interface in a basic input/output system menu, the unified setup interface enabling the firmware update image being loaded from the storage device, retrieving one or more firmware update images from a storage device associated with the computing device, and updating the firmware associated with the embedded device of the computing device with a respective firmware update image of the one or more firmware update images.

According to some embodiments, a service controller, e.g. baseboard management controller (BMC) or an innovation engine, can be utilized to remotely initiate a firmware update mode of a computing device. The BMC can establish a dedicated network interface with a remote management device regardless of the main processor's operation status. The BMC can communicate with a BIOS of the computing device for updating a firmware of an embedded device. In addition to a service controller, the firmware update mode can be initiated by a mechanical switch or a hardware jumper on the motherboard.

Although many of the examples herein are described with reference to utilizing a BMC, it should be understood that these are only examples and the present technology is not limited in this regard. Rather, any service controller that is independent from the main CPU can be utilized.

Additionally, even though the present disclosure uses remote management control protocol (RMCP) or intelligent platform management bus/bridge (IPMB) as examples approach of how to transmit data between different devices/components, the present technology is applicable to other protocols that can handle the data transmission described herein.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the technologies are disclosed in the following detailed description and the accompanying drawings.

DETAILED DESCRIPTION

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

Embedded firmware is used to control the specific functions of an embedded device. Existing approaches to update an embedded firmware are not suitable for large-scale firmware updates for several reasons.

Firstly, the typical firmware update process is executed after a regular system booting into an operation system (OS), e.g., the Microsoft Windows® OS, the Linux® OS, or any operating system. To allow the updated firmware to take effect, the computing device has to be rebooted, which consumes a relatively long time for each firmware update to take effect.

Secondly, the typical firmware update process lacks a centralized interface for updating several firmware at the same time. For example, each firmware of a specific embedded device (e.g., a service controller) requires a different utility software operable to update the specific firmware. As such, for the numerous embedded devices in a computing device, updating these firmware with various utility software is difficult to manage.

Lastly, the typical firmware update process does not provide a mechanism for recording a firmware update log which can record details of the firmware update for record keeping. Such a firmware update log can assist the administrator to diagnose problems detected in firmware functions.

Thus, there is a need to provide a unified firmware management system that can offer flexible and efficient firmware update mechanisms for embedded devices in a computing system.

According to some embodiments, the present technology can enable a firmware update by loading an updated firmware image during a booting process of the computing device. Particularly, aspects of the present technology can improve the efficiency of the firmware update by providing a firmware update mode in the booting process that can provide a centralized interface for multiple firmware updates.

Figure 1:
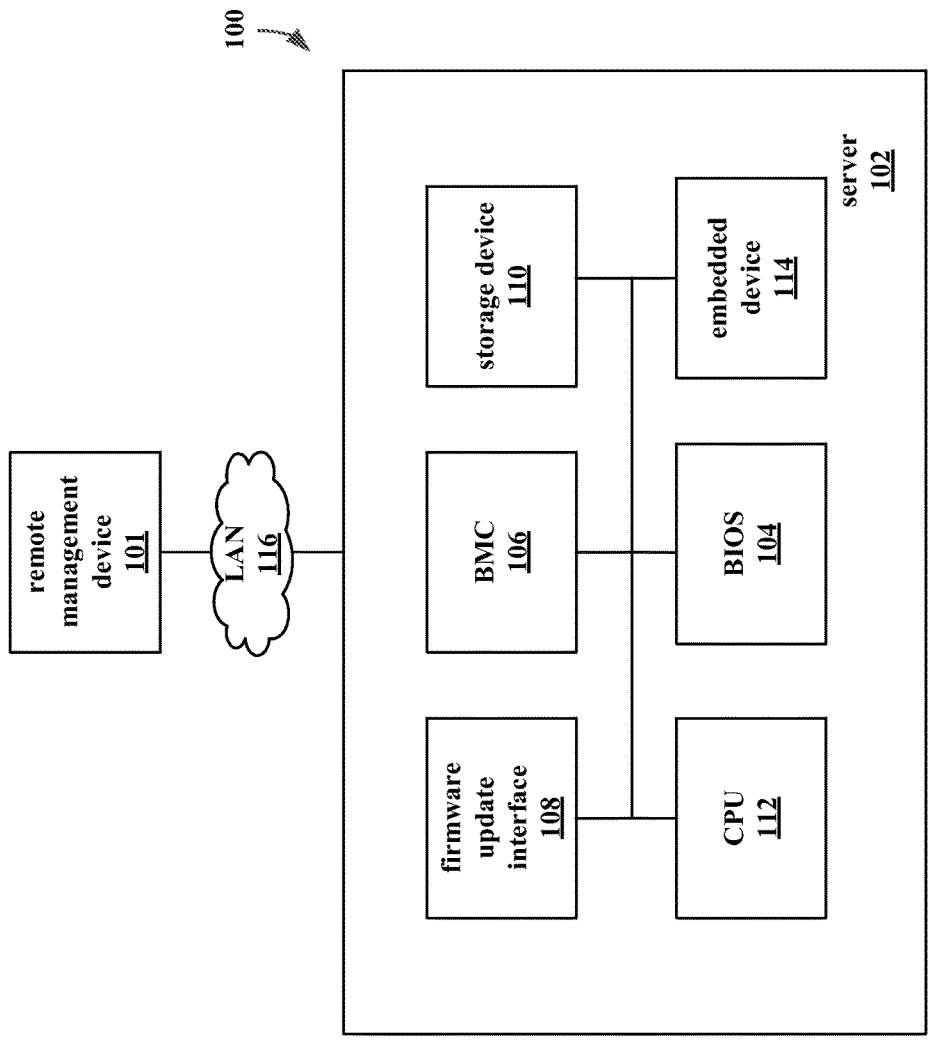
FIG. 1 is a schematic block diagram illustrating an example of a unified firmware management system, according to some embodiments.

FIG. 1 is a schematic block diagram illustrating an example of a unified firmware management system 100, according to some embodiments. It should be appreciated that the topology in FIG. 1 is an example, and any numbers of servers, remote management device and system components may be included in the system of FIG. 1.

A unified firmware management system 100 can include, for example, remote management device 101 and server 102. Server 102 can communicate with remote management device 101 via a wired network connection such as Ethernet, or a wireless network connection such as LAN 116 (local area network). Remote management device 101 can be any suitable computing device that can be used by a system administrator to manage a server. For example, remote management device 101 can be a personal computer or a tablet.

For purpose of this disclosure, server 102 can be any computing device operable to compute and process any form of data. For example, server 102 can be a personal computer, a network storage device, a network computing device. According to some embodiments, server 102 can include CPU 112 (central processing unit), BIOS 104, embedded device 114, BMC 106 (baseboard management controller), storage device 110 and firmware update interface 108. Server 102 can additionally include, for example, various input/output devices such as a display, one or more storage devices such as redundant array of independent disks (RAID), and one or more network interface controllers (NICs).

CPU 112 can be a central processing unit configured to execute program instructions for specific functions. For example, during a booting process, CPU 112 can access BIOS 104 stored in a BIOS memory or chip and execute program instructions to initialize server 102.

BIOS 104 can include any program instructions or system firmware configured to initiate and identify various components of server 102. Particularly, BIOS 104 includes initiation program instructions that are executed when the computer system is first powered on, along with a set of configurations specified for the BIOS. BIOS 104 typically recognizes, initializes, and tests hardware in a computing system, such as a keyboard, a display, a data storage, and other input or output devices. BIOS 104 can be stored in a non-volatile memory (e.g., a non-volatile random-access memory (NVRAM) or a read-only memory (ROM).

For example, BIOS 104 can run system check prior to booting up the operating system (OS), e.g., the Microsoft Windows® OS, the Linux® OS, or any operating system. System check is a diagnostic system examination executed during initialization of a computing device. A Power-On Self-Test (POST) is an example of system check. The major functions of POST are handled by BIOS 104, which may assign some of these duties to other programs designed to initialize specific peripheral devices, such as video and small computer system interface (SCSI) initialization. The principal functions of the BIOS during POST include verifying CPU registers and the integrity of the BIOS code, checking basic components, examining system main memory, and passing control to other specialized BIOS extension. POST can also be configured to discover, initialize, and catalog all system buses and devices, provide a user interface for system's configuration, and construct a system environment required by the operating system. Upon completion of POST, BIOS 104 can finally transfer control of the computer system to an operating system.

During POST, BIOS 104 can also provide an interface that allows a variety of different parameters to be set. According to some embodiments, BIOS 104 can provide a unified setup interface in a basic input/output system menu for embedded firmware updates. For example, BIOS 104, by receiving a firmware update signal from BMC 106, can determine that a firmware update mode has been initiated. Consequently, BIOS 104 can display a firmware update interface 108 in a BIOS menu which includes firmware information that needs to be updated. Using remote management device 101, an administrator can browse, select and load a firmware update image stored in storage device 110. According to some embodiments, BIOS 104 can execute a firmware update driver to load the selected update firmware of the embedded device.

Storage device 110 can be any storage medium configured to store program instructions or data for a period of time. Storage device 110 can be an independent storage device. For example, storage device 110 can be a Universal Serial Bus (USB) flash drive that is inserted into server 102. Additionally, storage device 110 can be a random access memory (RAM), a non-volatile random-access memory (NVRAM), a read-only memory, an electrically erasable programmable read-only memory (EEPROM), a hard drive disk (HDD), or a combination thereof. Further, storage device 110 can include a remote storage system that is independent and operable to communicate with server 102 via a network interface, e.g. a local area network (LAN).

Storage device 110 can store one or more firmware update images, each of which is associated with an embedded device (e.g. embedded device 114) of server 102. Each firmware update images can be released by the firmware manufacture to update an existing firmware, such as providing a new function or fixing a bug.

As illustrated in FIG. 1, server 102 can include one or more service controllers such as BMC 106. A BMC is an independent and embedded microcontroller that, in some embodiments, is responsible for the management and monitoring of the main central processing unit (e.g., processor) and peripheral devices on the motherboard (e.g., switches, computing nodes and storage nodes). According to some embodiments, BMC 106 can communicate with remote management device 101 via a dedicated network interface (e.g., a LAN) implemented by an associated network interface controller (not shown).

With a power supply and operating system that are independent from CPU 112, BMC 106 can implement out-of-band management when server 102 is powered off or disabled. An out-of-band management can use a dedicated channel for managing network devices. For example, BMC 106 can communicate with remote management device 101 via Remote Management Control Protocol (RMCP) or RMCP+ for Intelligent Platform Management Interface (IPMI) over LAN.

The IPMI specification defines an interface to the hardware that monitor server physical health characteristic such as temperature, voltage, fans, power supplies and chassis status. For example, the IPMI specification includes automatic alerting, automatic system shutdown and restart, remote restart and power control capabilities. By utilizing a service controller like a BMC, the IPMI specification also defines an interface for remote management of servers and systems that is independent from the main CPU, BIOS and operation system.

According to some embodiments, BMC 106 can host a web user interface (UI) that is accessible by remote management device 101. The web user interface allows an administrator to indicate that a firmware update needs to be updated, for example, by clicking a selectable option in the interface. During a booting process of server 102, BMC 106, in response to receiving a signal or message from remote management device 101, can generate a firmware update signal or message to indicate that an embedded firmware needs to be updated. Upon receiving the firmware update signal, BIOS 104 can determine that the system enters a firmware update mode, as described later in the specification.

According to some embodiments, BMC 106 can store a firmware update log that can include firmware version information, firmware specification, and update time. The firmware update log can be used by an administrator to troubleshoot system errors. For example, the firmware update log can be a system event log (SEL) that records various event information (e.g., application events, update events) related to server 102.

According to some embodiments, BMC 106 can provide a copy of the firmware update log to remote management device 101. For example, BMC 106 can retrieve the firmware update log from the storage device and transmit the log to a remote management device via, for example, a LAN.

Besides a BMC, the firmware update process can be enabled by a mechanical switch or a hardware jumper (not shown) on the motherboard. Additionally, other independent service controller, e.g., an innovation engine, can be utilized to perform functions described herein.

Embedded device 114 can be any type of onboard device that is operable to execute a specific function of server 102. For example, an embedded device can be a BMC, a network interface controller, a redundant array of inexpensive disks (RAID) controller. Each embedded device is associated with a corresponding firmware to control its specific function, such as motherboard monitoring.

Figure 2:
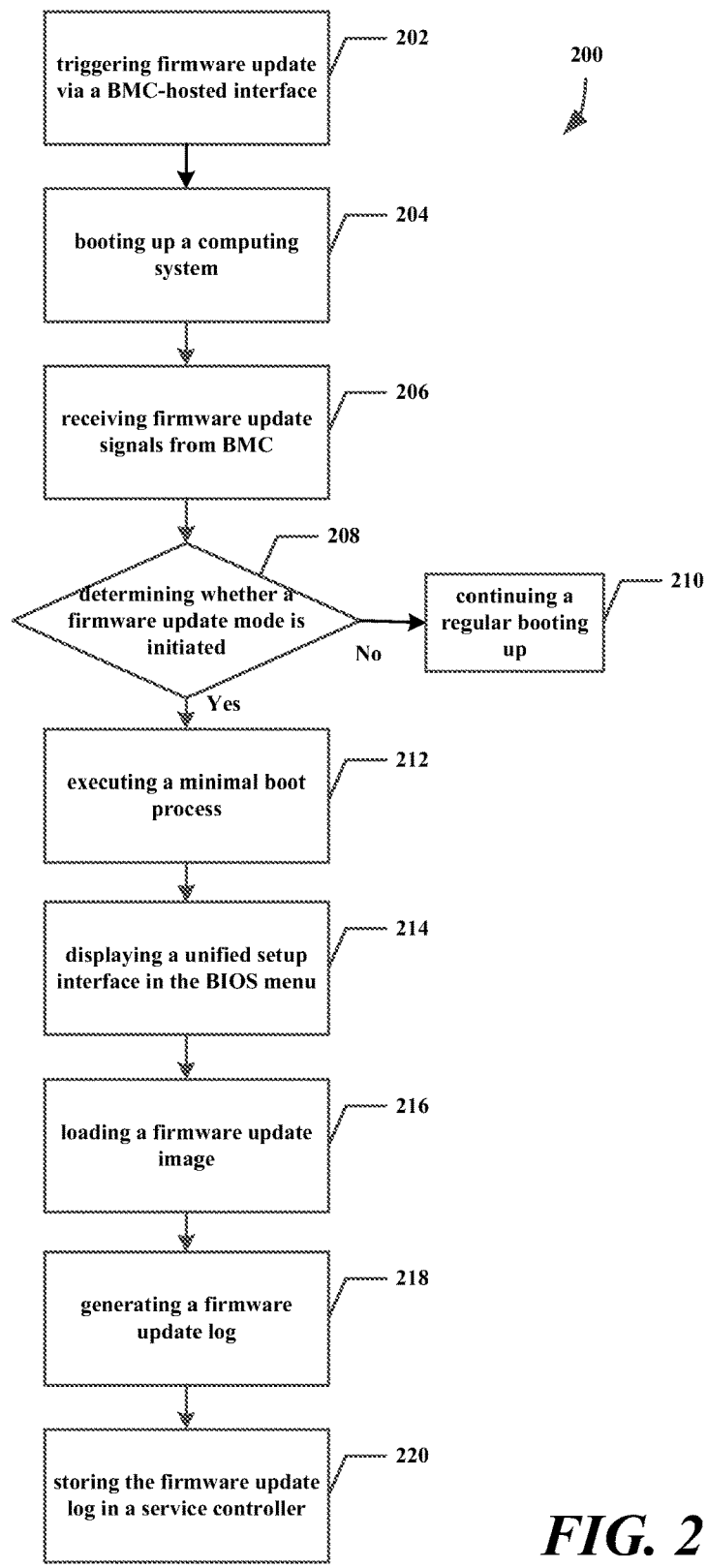
FIG. 2 is an example flow diagram for a unified firmware management system, according to some embodiments.

FIG. 2 is an example flow diagram for a unified firmware management system, according to some embodiments. It should be understood that there can be additional, fewer, or alternative steps performed in similar or alternative orders, or in parallel, within the scope of the various embodiments unless otherwise stated.

At step 202, an administrator can trigger a firmware update mode of a computing via a BMC-hosted interface. For example, as illustrated in FIG. 1, BMC 106 can host a web user interface that can be displayed on remote management device 101. By selecting a firmware update function on the web user interface, the administrator thus initiates a firmware update mode of server 102, which can include steps 204-220 without excluding less or more alternative steps.

According to some embodiments, BMC 106 can generate a firmware update signal indicating that at least one firmware associated with embedded device 114 needs to be updated. According to some embodiments, BIOS 104 can determine that server 102 needs to enter firmware update mode by detecting an updated firmware image in a storage device, e.g., a flash USB drive. Consequently, BIOS 104 can automatically switch to the firmware update mode including displaying a unified setup interface during POST.

According to some embodiments, BMC 106 can initiate a system reset in which BIOS 104 can communicate with BMC 106 via IMPI messages. BIOS 104 can further determine whether the system has entered the firmware update mode by various mechanisms disclosed herein, e.g. receiving a firmware update signal from BMC 106, or determining an updated firmware image in a storage device. Besides a BMC, other independent service controller, e.g., an innovation engine, can perform functions described herein.

At step 204, a computing system can be rebooted to initiate the firmware update mode. For example, server 102 can be rebooted by executing BIOS 104 that is responsible for initializing and testing hardware components of server 102. During a POST process, BIOS 104 can provide an interactive pathway to update embedded firmware of one or more embedded devices in server 102.

At step 206, a BIOS can receive firmware update signals from a BMC. For example, during a POST process, BIOS 104 can communicate with BMC 106 to determine whether server 102 has entered a firmware update mode, for example, via IPMI messages or physical hardware signal connection. According to some embodiments, BIOS 104 can receive a firmware update signal or message from BMC 106. Alternatively, BIOS 104 can receive a firmware update signal or message from other computing device such as remote management device 101. According to some embodiments, BIOS 104 can autonomously determine that one or more firmware update images are stored a storage device (e.g., a flash USB drive) and initiate the firmware update mode. For example, BIOS 104 can determine whether a specific type of file name exists on storage device 110. Further, in addition to an on-board storage device, storage device 110 can be a networked storage device that is operable to communicate with server 102 via a network interface, e.g. an intranet or a LAN.

At step 208, the system can determine whether a firmware update mode is initiated. For example, the firmware update signal can indicate that at least one firmware associated with an embedded device needs to be updated. These updated firmware images can be released by several firmware manufactures, each of which provides a specific firmware to pair with a corresponding embedded device.

At step 210, when a firmware update mode is not initiated, the POST process can continue as a typical booting process. For example, BIOS 104 can execute all initiating functions such as verifying related hardware components of server 102. At the completion of the POST process, BIOS 104 can transfer the system control to an operation system.

At step 212, when a firmware update mode has been initiated, the system can execute a minimal boot process aiming to reduce unnecessary booting steps. For example, BIOS 106 can skip executing unessential functions that are unrelated to the firmware update process to reduce processing time. Particularly, BIOS 104 can omit loading some or all drivers of the embedded devices, including a driver for initiating system management BIOS (SMBIOS) table, or a driver for initializing advanced configuration and power interface (ACPI) table. Other drives that can be omitted include, for example, a driver for supporting ACPI S3 sleep mode, a driver for supporting BIOS recovery, a driver for producing network protocols, or a driver for supporting windows hardware error architecture (WHEA). Additionally, the minimal booting process can skip or omit initializing CPU cores or memory device, scanning and assigning resources for Peripheral Component Interconnect Express (PCIe) devices, and initializing bootable devices such as hard drive disks (HDDs). Additionally, the minimal boot process is an optional process that does not need to be executed in the firmware update mode.

At step 214, the system can display a unified setup interface in the BIOS menu. For example, BIOS 104 can display a firmware update interface 108 in a BIOS menu. The firmware update interface can include firmware information that is available for the update. Firmware update interface 108 can include metadata related to one or more updated firmware images such as firmware version information or function descriptions of an updated firmware image. The one or more updated firmware images can be stored in an external storage device is recognized by BIOS 104. In addition to an external storage device such as a flash USB drive, other storage devices can include a random access memory (RAM), a non-volatile random-access memory (NVRAM), a read-only memory (ROM), an electrically erasable programmable read-only memory (EEPROM), or a remote storage device located in the intranet/internet Additionally, firmware update interface 108 can further enable an administrator to select an updated firmware image to be loaded for replacing the existing firmware. Using remote management device 101, an administrator can browse, select and select a firmware update image stored in storage device 110 to be loaded to replace a firmware of embedded device 114. According to some embodiments, without requiring a selection of the update firmware image, firmware update interface 108 can automatically generate a message to prompt an administrator to confirm that a firmware update process will be executed.

According to some embodiments, the unified setup interface can adopt a user-friendly BIOS menu that is simplified for the firmware update mode. For example, in an optional process of the firmware update mode, firmware update interface 108 can omit non-essential BIOS options that are irrelevant for the firmware update. These non-essential BIOS options include, for example, console redirection. Further, by employing multiple selectable options, the unified setup interface can enable a selected firmware update image to be directly loaded to a storage device of the embedded device, without receiving complex commands or parameters. According to some embodiments, BIOS 104 can execute a firmware update driver to load the selected update firmware of the embedded device.

At step 216, a selected firmware update image can be loaded for replacing an existing firmware. For example, BIOS 104 can execute a firmware update driver to load a selected firmware update image to a storage device associated with the embedded device. When there are multiple update firmware images each corresponding to a respective embedded device, an administrator can arrange a priority order for updating these firmware images.

At step 218, after completing the firmware update, the system can generate a firmware update log. For example, BIOS 104 can generate a firmware update log and transmit the log to BMC 106. The firmware update log can include information related to the completed firmware update, e.g. firmware version information, firmware specification, and update time. An example of the firmware update log is a system event log (SEL).

At step 220, the system can store the firmware update log in a service controller. For example, following generating the firmware update log, BMC 106 can store the firmware update log in a storage device that is either shared with server 102 or independent from it. At a later pint, an administrator can retrieve and review the firmware update log for troubleshooting analysis.

Further, at the conclusion of the firmware update mode, the system can be rebooted normally so that the updated firmware will take effect to control its corresponding embedded device.

Figure 3:
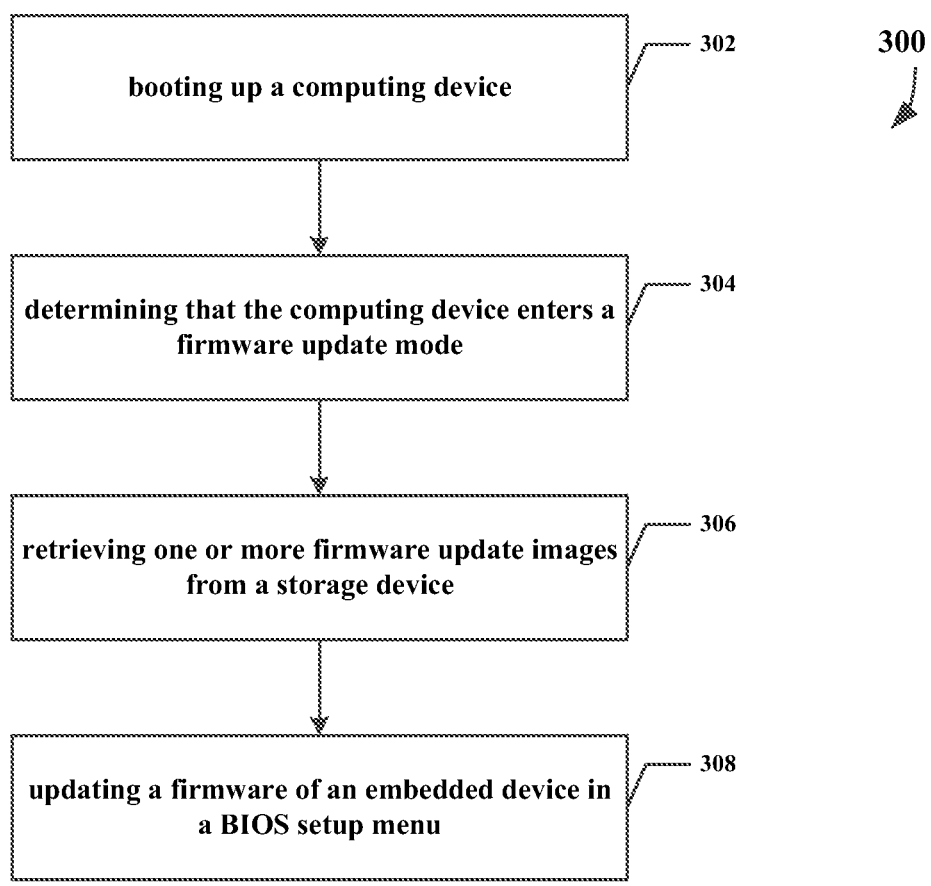
FIG. 3 is another example flow diagram for a unified firmware management system, according to some embodiments.

FIG. 3 is another example flow diagram for a unified firmware management system, according to some embodiments. It should be understood that there can be additional, fewer, or alternative steps performed in similar or alternative orders, or in parallel, within the scope of the various embodiments unless otherwise stated.

At step 302, a computing system can be rebooted to initiate the firmware update mode. For example, as illustrated in FIG. 1, server 102 can be rebooted by executing BIOS 104 that is responsible for initializing and testing hardware components of server 102. During a POST process, BIOS 104 can provide an interactive pathway to update embedded firmware of one or more embedded devices in server 102.

At step 304, the system can determine whether a firmware update mode is initiated. For example, a BIOS can receive firmware update signals or messages from a BMC. Particularly, during a POST process, BIOS 104 can communicate with BMC 106 to determine whether server 102 has entered a firmware update mode, via IPMI messages or physical hardware signal connection. According to some embodiments, BIOS 104 can receive a firmware update signal or message from BMC 106. Alternatively, BIOS 104 can receive a firmware update signal or message from other computing device such as remote management device 101. According to some embodiments, BIOS 104 can autonomously determine that one or more firmware update images are stored a storage device (e.g., a flash USB drive) and initiate the firmware update mode.

At step 306, the system can receive one or more firmware update images from a storage device. For example, during the firmware update mode, the system can display a unified setup interface in the BIOS menu. BIOS 104 can display a firmware update interface 108 in a BIOS menu which includes firmware information that is available for updating. Firmware update interface 108 can include metadata related to one or more updated firmware images including version information, descriptions of an updated firmware image. The one or more updated firmware images can be stored in an external storage device is recognized by BIOS 104.

Additionally, firmware update interface 108 can further enable an administrator to select an updated firmware image to be loaded for replacing the existing firmware. Using remote management device 101, an administrator can browse, select and select a firmware update image stored in storage device 110 to be loaded to replace a firmware of embedded device 114. For example, when there are multiple update firmware images each corresponding to a respective embedded device, an administrator can arrange a priority order for updating these firmware images.

According to some embodiments, without requiring a selection of the update firmware image, firmware update interface 108 can automatically generate a message to prompt an administrator to confirm that a firmware update process will be executed.

Further, the unified setup interface can adopt a user-friendly BIOS menu that is simplified for the firmware update mode. For example, in an optional process of the firmware update mode, firmware update interface 108 can omit non-essential BIOS options that are irrelevant for firmware updating. These non-essential BIOS options include, for example, console redirection. Further, by employing multiple selectable options, the unified setup interface can enable a selected firmware update image to be directly loaded to a storage device of the embedded device, without receiving complex commands or parameters.

At step 308, the system can update at least one firmware of an embedded device via the firmware update interface in the BIOS menu. For example, after selecting a firmware update image from storage device 110, BIOS 104 can load the firmware update image to replace an existing firmware. According to some embodiments, when there are multiple firmware update images stored, BIOS 104 can load these images in series or in a priority order specified by the administrator.

Figure 4:
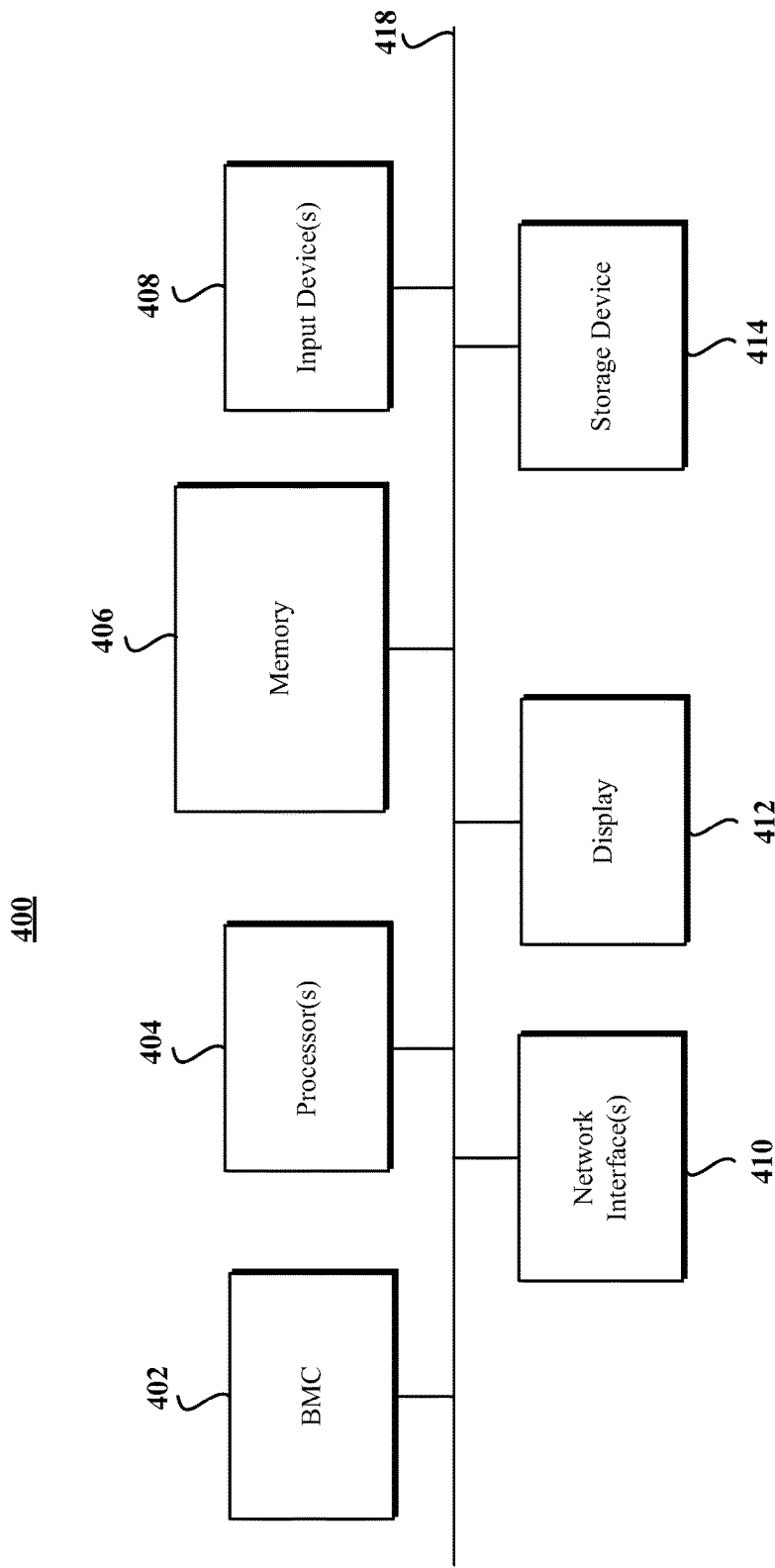
FIG. 4 illustrates a computing platform of a computing device, according to some embodiments.

FIG. 4 illustrates an example system architecture 400 for implementing the systems and processes of FIGS. 1-3. Computing platform 400 includes a bus 418 which interconnects subsystems and devices, such as: BMC 402, processor 404, memory 406, input device 408, network interfaces 410, display 412 and storage device 414. Processor 404 can be implemented with one or more central processing units ("CPUs"), such as those manufactured by Intel® Corporation—or one or more virtual processors—as well as any combination of CPUs and virtual processors. Computing platform 400 exchanges data representing inputs and outputs via input-and-output devices input devices 408 and display 412, including, but not limited to: keyboards, mice, audio inputs (e.g., speech-to-text devices), user interfaces, displays, monitors, cursors, touch-sensitive displays, LCD or LED displays, and other I/O-related devices.

According to some examples, computing architecture 400 performs specific operations by processor 404, executing one or more sequences of one or more instructions stored in memory 406. Computing platform 400 can be implemented as a server device or client device in a client-server arrangement, peer-to-peer arrangement, or as any mobile computing device, including smart phones and the like. Such instructions or data may be read into memory 406 from another computer readable medium, such as a storage device. In some examples, hard-wired circuitry may be used in place of or in combination with software instructions for implementation. Instructions may be embedded in software or firmware. The term "computer readable medium" refers to any tangible medium that participates in providing instructions to processor 404 for execution. Such a medium may take many forms, including, but not limited to, non-volatile media and volatile media. Non-volatile media includes, for example, optical or magnetic disks and the like. Volatile media includes dynamic memory, such as memory 406.

Common forms of computer readable media includes, for example: floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 418 for transmitting a computer data signal.

In the example shown, memory 406 can include various software programs that include executable instructions to implement functionalities described herein. In the example shown, memory 406 includes a log manager, a log buffer, or a log repository—each can be configured to provide one or more functions described herein.

Although the foregoing examples have been described in some detail for purposes of clarity of understanding, the above-described inventive techniques are not limited to the details provided. There are many alternative ways of implementing the above-described techniques. The disclosed examples are illustrative and not restrictive.

What is claimed is:

1. A computer-implemented method, comprising:
   booting up a computing device;
   during the booting of the computing device, determining, via a basic input/output system (BIOS) of the computing device, that the computing device enters a firmware update mode configured to update a first firmware associated with a first embedded device of the computing device;
   in response to determining that the firmware update mode is initiated in the computing device, executing a minimal boot process, the minimal boot process configured to skip executing at least one function that is unrelated to firmware update process of the computing device to reduce processing time, and skip initializing a central processing unit (CPU) of the computing device, scanning and assigning resources for peripheral component interconnect express (PCIe) devices of the computing device, and initializing a bootable device of the computing device;
   loading a first firmware update image of the one or more firmware update images;
   storing the first firmware update image of the one or more firmware update images in a storage device associated with the computing device;
   rebooting up the computing device;
   retrieving the first firmware update image of the one or more firmware update images from the storage device associated with the computing device; and
   updating the first firmware associated with the first embedded device of the computing device with the first firmware update image of the one or more firmware update images.

2. The computer-implemented method of claim 1, further comprising:
   receiving a firmware update signal from a service controller, the firmware update signal indicating that the first firmware associated with the first embedded device of the computing device needs to be updated.

3. The computer-implemented method of claim 1, further comprising:
determining that the one or more firmware update images are being stored in the storage device associated with the computing device.

4. The computer-implemented method of claim 3, further comprising:
displaying a unified setup interface in a basic input/output system (BIOS) menu, the unified setup interface enabling the first firmware update image of one or more firmware update images being loaded from the storage device associated with the computing device.

5. The computer-implemented method of claim 4, further comprising:
updating a second firmware associated with a second embedded device of the computing device with a second firmware update image of the one or more firmware update images.

6. The computer-implemented method of claim 4, further comprising:
selecting, via the unified setup interface in the basic input/output system (BIOS) menu, the first firmware update image from the one or more firmware update images.

7. The computer-implemented method of claim 1, further comprising:
generating a firmware update log including information related to updating the first firmware associated with the first embedded device of the computing device;
transmitting the firmware update log to a service controller associated with the computing device; and
storing the firmware update log in a storage medium.

8. The computer-implemented method of claim 1, wherein the storage device associated with the computing device is at least one of a flash drive, a random access memory, a non-volatile random-access memory, a read-only memory, an electrically erasable programmable read-only memory, or a hard drive disk.

9. The computer-implemented method of claim 1, wherein the storage device associated with the computing device is a networked storage device that is operable to communicate with the computing device via a network interface.

10. The computer-implemented method of claim 1, wherein the first embedded device of the computing device is configured to, by executing an associated firmware, perform a specific function of the computing device.

11. A system, comprising:
a processor; and
a memory storing instructions that, when executed by the processor, cause the processor to:
boot up the system;
during the booting of the system, determine, via a basic input/output system (BIOS) of the system, that the system enters a firmware update mode configured to update a first firmware associated with a first embedded device of the system;
in response to determining that the firmware update mode is initiated in the system, execute a minimal boot process, the minimal boot process configured to skip executing at least one function that is unrelated to firmware update process of the system to reduce processing time, and skip initializing a central processing unit (CPU) of the system, scanning and assigning resources for peripheral component interconnect express (PCIe) devices of the system, and initializing a bootable device of the system;
display a unified setup interface in a basic input/output system (BIOS) menu, the unified setup interface enabling a first firmware update image of one or more firmware update images being loaded from a storage device associated with the system;
load the first firmware update image of the one or more firmware update images;
store the first firmware update image of the one or more firmware update images in the storage device associated with the system;
reboot up the system;
retrieve the first firmware update image of the one or more firmware update images from the storage device associated with the system; and
update the first firmware associated with the first embedded device of the system with the first firmware update image of the one or more firmware update images.

12. The system of claim 11, further storing instructions that, when executed by the processor, cause the processor to:
update a second firmware associated with a second embedded device of the system with a second firmware update image of the one or more firmware update images.

13. The system of claim 11, further storing instructions that, when executed by the processor, cause the processor to:
select, via the unified setup interface in the basic input/output system (BIOS) menu, the first firmware update image from the one or more firmware update images.

14. The system of claim 11, further storing instructions that, when executed by the processor, cause the processor to:
generate a firmware update log including information related to updating the first firmware associated with the first embedded device of the system;
transmit the firmware update log to a service controller associated with the system; and
store the firmware update log in a storage medium.

15. A non-transitory computer-readable storage medium storing instructions, which, when executed by a processor, cause the processor to perform operations comprising:
booting a computing device;
during the booting of the computing device, determining, via a basic input/output system (BIOS) of the computing device, that the computing device enters a firmware update mode configured to update a first firmware associated with a first embedded device of the computing device;
in response to determining that the firmware update mode is initiated in the computing device, executing a minimal boot process, the minimal boot process configured to skip executing at least one function that is unrelated to firmware update process of the computing device to reduce processing time, and skip initializing a central processing unit (CPU) of the computing device, scanning and assigning resources for peripheral component interconnect express (PCIe) devices of the computing device, and initializing a bootable device of the computing device;
displaying a unified setup interface in a basic input/output system (BIOS) menu, the unified setup interface enabling a first firmware update image of one or more firmware update images being loaded from a storage device associated with the system;
loading the first firmware update image of the one or more firmware update images;

storing the first firmware update image of the one or more firmware update images in the storage device associated with the computing device;

rebooting up the computing device;

retrieving the first firmware update image of the one or more firmware update images from the storage device associated with the computing device; and updating the first firmware associated with the first embedded device of the computing device with the first firmware update image of the one or more firmware update images.

16. The non-transitory computer-readable storage medium of claim 15, wherein the storage device associated with the computing device is at least one of a flash drive, a random access memory, a non-volatile random-access memory, a read-only memory, an electrically erasable programmable read-only memory, or a hard drive disk.

17. The non-transitory computer-readable storage medium of claim 15, wherein the first embedded device of the computing device is configured to, by executing an associated firmware, perform a specific function of the computing device.

18. The non-transitory computer-readable storage medium of claim 15, which, when executed by the processor, cause the processor to further perform operations comprising:

generating a firmware update log including information related to updating the first firmware associated with the first embedded device of the computing device;

transmitting the firmware update log to a service controller associated with the computing device; and storing the firmware update log in a storage medium.

* * * * *